United States Patent
Ishizuka et al.

(10) Patent No.: US 10,839,619 B2
(45) Date of Patent: Nov. 17, 2020

(54) ELECTRONIC CONTROL UNIT AND METHOD FOR CONNECTION AUTHENTICATION

(71) Applicant: Toyota Jidosha Kabushiki Kaisha, Toyota (JP)

(72) Inventors: Shu Ishizuka, Okazaki (JP); Masashi Amesara, Toyota (JP); Toshio Kawamura, Nagakute (JP); Yasuhiro Yamasaki, Okazaki (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 16/249,661

(22) Filed: Jan. 16, 2019

(65) Prior Publication Data
US 2019/0236856 A1    Aug. 1, 2019

(30) Foreign Application Priority Data
Jan. 26, 2018    (JP) .................. 2018-011661

(51) Int. Cl.
  G07C 5/00    (2006.01)
  H04L 12/24   (2006.01)
  B60R 16/023  (2006.01)
  G07C 5/08    (2006.01)
  H04L 29/08   (2006.01)

(52) U.S. Cl.
  CPC .......... *G07C 5/008* (2013.01); *B60R 16/0232* (2013.01); *G07C 5/0808* (2013.01); *H04L 41/0809* (2013.01); *H04L 67/12* (2013.01); *G07C 2205/02* (2013.01)

(58) Field of Classification Search
CPC .. G07C 5/008; G07C 2205/02; G07C 5/0816; G07C 5/0808; G07C 5/0825; G07C 5/00; G07C 5/08; G07C 22/00; H04L 2012/40215
See application file for complete search history.

(56) References Cited

U.S. PATENT DOCUMENTS

| 7,327,227 | B2 * | 2/2008  | Ohtaki  | B60R 25/04   |
|           |      |         |         | 340/426.1    |
| 8,583,317 | B2 * | 11/2013 | Nishida | H04L 9/3234  |
|           |      |         |         | 701/31.4     |
| 9,280,653 | B2 * | 3/2016  | Forest  | G06F 21/44   |

(Continued)

FOREIGN PATENT DOCUMENTS

| JP | 2002-176430 A | 6/2002 |
| JP | 2016-048848 A | 4/2016 |
| JP | 2017-123570 A | 7/2017 |

*Primary Examiner* — Sargon N Nano
(74) *Attorney, Agent, or Firm* — Dinsmore & Shohl LLP

(57) ABSTRACT

An electronic control unit mounted on a vehicle includes a processor configured to: detect a connection request from an outside device; determine, in response to the connection request, whether or not a start condition for starting a connection authentication process is satisfied, the connection authentication process being a process for determining propriety of the connection request from the outside device; control a communication state between the outside device and the electronic control unit such that the communication state becomes a linkup state when the start condition is satisfied; and start the connection authentication process when the communication state is the linkup state.

6 Claims, 3 Drawing Sheets

(56) References Cited

U.S. PATENT DOCUMENTS

| | | | |
|---|---|---|---|
| 9,425,963 B2* | 8/2016 | Nairn | H04L 9/3242 |
| 9,460,567 B2* | 10/2016 | Huang | G07C 5/008 |
| 10,228,903 B2* | 3/2019 | Kang | H04W 76/14 |
| 2011/0231055 A1* | 9/2011 | Knight | G07C 5/008 |
| | | | 701/31.4 |
| 2012/0035804 A1* | 2/2012 | Roberts | G07C 5/0808 |
| | | | 701/33.2 |
| 2014/0277915 A1* | 9/2014 | Bertosa | G07C 5/008 |
| | | | 701/31.4 |
| 2014/0316621 A1* | 10/2014 | Martin | G01M 15/042 |
| | | | 701/22 |
| 2015/0263860 A1* | 9/2015 | Leboeuf | H04L 9/3226 |
| | | | 713/171 |
| 2015/0351137 A1* | 12/2015 | Neff | G07C 5/0808 |
| | | | 370/329 |
| 2016/0026787 A1* | 1/2016 | Nairn | G06F 13/4282 |
| | | | 726/17 |
| 2016/0065298 A1 | 3/2016 | Nakagawa et al. | |
| 2016/0381055 A1* | 12/2016 | Galula | H04L 67/12 |
| | | | 726/23 |
| 2017/0193576 A1* | 7/2017 | Fish | G06Q 30/0611 |
| 2018/0190043 A1* | 7/2018 | Dominic | G07C 5/085 |
| 2018/0225891 A1* | 8/2018 | Lambourne | G07C 5/008 |
| 2018/0227306 A1* | 8/2018 | Borkowicz | H04L 63/101 |
| 2018/0254903 A1* | 9/2018 | Bardelski | G06F 21/72 |
| 2019/0081960 A1* | 3/2019 | Kupfer | H04L 12/40 |
| 2019/0081966 A1* | 3/2019 | Ploucha | H04L 63/1425 |
| 2019/0222484 A1* | 7/2019 | Ricci | B60R 16/037 |

* cited by examiner

ELECTRONIC CONTROL UNIT AND METHOD FOR CONNECTION AUTHENTICATION

CROSS-REFERENCE TO RELATED APPLICATIONS

This application claims priority to Japanese Patent Application No. 2018-011661 filed on Jan. 26, 2018, which is incorporated herein by reference in its entirety including the specification, drawings and abstract.

BACKGROUND

1. Technical Field

The present disclosure relates to an electronic control unit and a method for connection authentication.

2. Description of Related Art

A vehicle is equipped with a plurality of electronic control units for controlling a powertrain system (such as an engine, a transmission, and an anti-lock brake system), body-related components (such as doors, seats, and mirrors), multi-media systems (such as a navigation system and an audio system), and various sensors. The electronic control units are connected with each other through an on-board network (such as a controller area network or an Ethernet network) to control each unit of the vehicle while sharing information with each other. A diagnostic tool is used as a tool for supporting a maintenance management operation. The maintenance management operation includes collecting information about failure diagnosis of the electronic control units or on-board components under the electronic control units, and rewriting programs in a flash memory mounted on each of the electronic control units. Japanese Patent Application Publication No. 2016-48848 (JP 2016-48848 A) proposes that all the following conditions are to be satisfied as a permission condition for permitting connection of the diagnostic tool to the on-board network. The conditions include: (a) an authentication code included in a communication frame that is transmitted from the diagnostic tool matches an authentication code stored in a corresponding electronic control unit; (b) a correspondence relation between the authentication code and a connection target code included in the communication frame that is transmitted from the diagnostic tool matches a correspondence relation between the authentication code and a connection target code stored in the corresponding electronic control unit; and (c) the connection target code included in the communication frame that is transmitted from the diagnostic tool is the connection target code supportable by the corresponding electronic control unit. When such a permission condition is satisfied, it can be estimated that a connection request received is the request sent from the diagnostic tool of an official operator (for example, a dealer). This makes it possible to disconnect connection requests sent from the diagnostic tools of unofficial operators.

SUMMARY

In the method for connection authentication disclosed in JP 2016-48848 A, the communication state between a diagnostic tool and an electronic control unit turns into a linkup state when an activation line transits from non-active to active. Accordingly, when a large amount of communication frames are transmitted from the diagnostic tool, the on-board electronic control unit may fall into a hang-up state. When the vehicle is in automatic driving in particular, hardware resources of the on-board electronic control unit are consumed in considerable amounts. Under such circumstances, it becomes difficult to determine propriety of a connection request appropriately. When the diagnostic tool makes a connection request to the on-board network while a signal with a high safety request level is being transmitted on the on-board network, or while the vehicle is traveling, it becomes difficult to determine the propriety of the connection request.

The present disclosure proposes an electronic control unit and a method for connection authentication reducing the possibility of permitting an illegal connection request from an outside device even when such an illegal connection request is made while the resource of the on-board electronic control unit is being consumed.

A first aspect of the disclosure provides an electronic control unit mounted on a vehicle. The electronic control unit includes a processor configured to: detect a connection request from an outside device; determine, in response to the connection request, whether or not a start condition for starting a connection authentication process is satisfied, the connection authentication process being a process for determining propriety of the connection request from the outside device; control a communication state between the outside device and the electronic control unit such that the communication state becomes a linkup state when the start condition is satisfied; and start the connection authentication process when the communication state is the linkup state.

A second aspect of the disclosure provides a method for connection authentication. The method for connection authentication includes: detecting a connection request from an outside device to an on-board network; determining, in response to the connection request, whether or not a start condition for starting a connection authentication process is satisfied, the connection authentication process being a process for determining propriety of the connection request from the outside device; controlling a communication state between the outside device and the on-board network such that the communication state becomes a linkup state when the start condition is satisfied; and starting the connection authentication process when the communication state is the linkup state.

According to the above embodiments, it is possible to determine the propriety of the connection request from an outside device appropriately even when the connection request is made while the resource of the on-board electronic control unit is being consumed.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
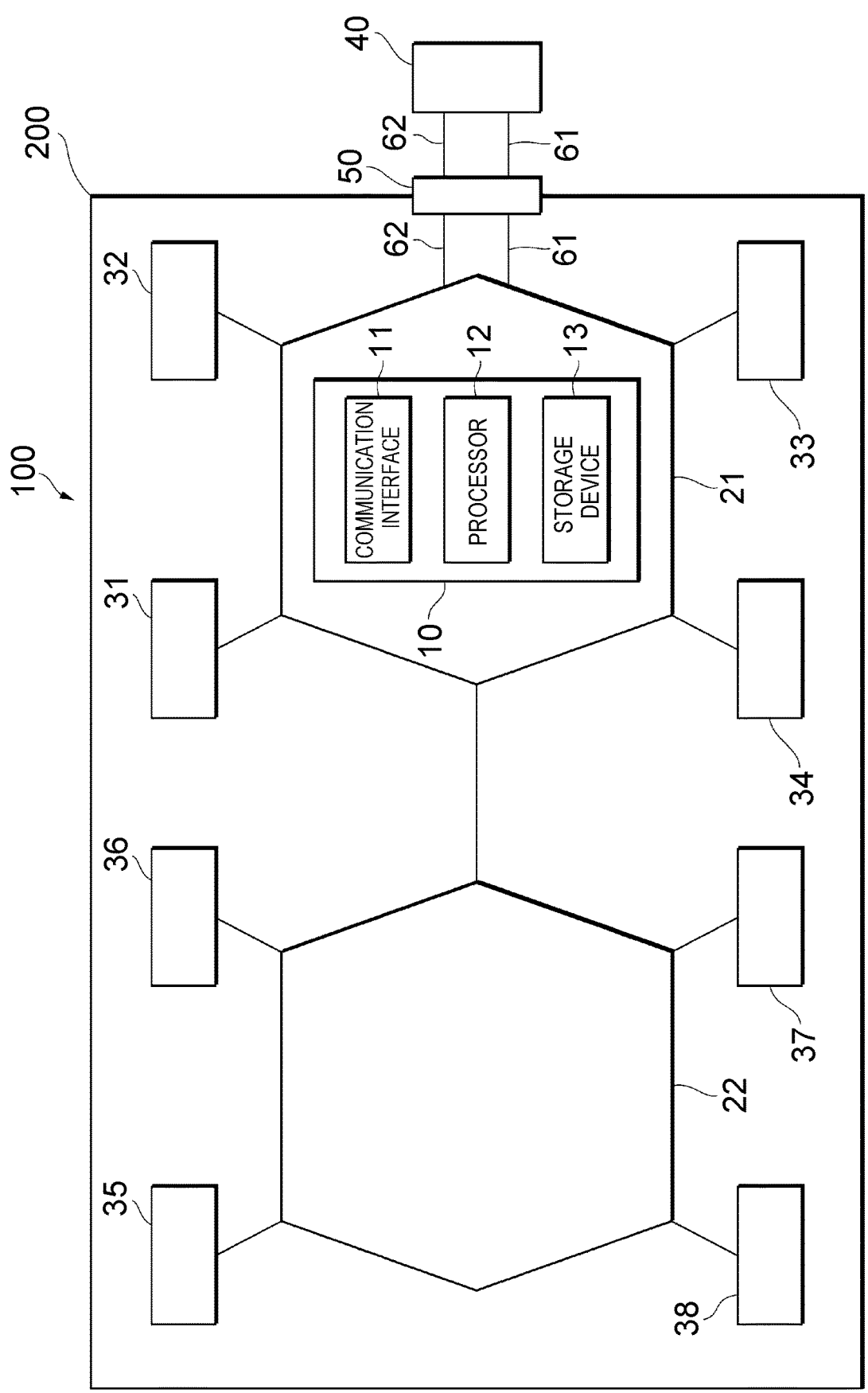
FIG. 1 is an explanatory view showing the configuration of an on-board network according to an embodiment of the present disclosure.

Hereinafter, embodiments of the present disclosure will be described with reference to the accompanying drawings. Here, like reference signs designate like component members, and redundant description is omitted. FIG. 1 is an explanatory view showing the configuration of an on-board network 100 according to an embodiment of the present disclosure. The on-board communication network 100 includes a plurality of concentrators 21, 22 that connects a plurality of electronic control units 31 to 38 mounted on a vehicle 200. As a communication line connecting between the concentrators 21, 22 and the electronic control units 31 to 38, an Ethernet cable in conformity to 100Base-T1 standards may be used, for example. As the concentrators 21, 22, an Ethernet switch having a bridging function can be used, for example. For example, the electronic control units 31 to 38 controls a powertrain system of a vehicle (such as an engine, a transmission, and an anti-lock brake system), body-related components (such as doors, seats, and mirrors), multi-media systems (such as a navigation system, and an audio system), or various sensors.

The vehicle 200 includes a connector 50 for connecting an outside device 40. The connector 50 conforms to, for example, International Organization for Standardization (ISO) 15031-3 standards, or United States Society of Automotive Engineers (SAE) J1962 standards. For example, the outside device 40 is a diagnostic tool that performs diagnosis communication for maintenance management of the vehicle 200. The diagnosis communication includes communication for requesting transmission of self-diagnostic message information to the electronic control units 31 to 38 from the diagnostic tool, or for transmitting, in response to the request, the self-diagnostic message information to the diagnostic tool from the electronic control, units 31 to 38. The self-diagnostic message information refers to the information related to failure diagnosis of the electronic control units 31 to 38 or the components (for example, sensors, actuators, and the like) under the electronic control units 31 to 38. For example, the diagnosis communication also includes communication for rewriting programs in the flash memories mounted on the electronic control units 31 to 38.

The vehicle 200 includes a communication line 61 for communication with the outside device 40, and an activation line 62 for detecting a connection request from the outside device 40. The activation line 62 is designed to conform to ISO 13400 standards. The activation line 62 transits from non-active to active when the outside device 40 is connected to the connector 50. As the communication line 61, an Ethernet cable in conformity to 100Base-TX standards can be used, for example.

The concentrator 21 includes an electronic control unit 10 that performs a connection authentication process for determining the propriety of a connection request from the outside device 40. The electronic control unit 10 is a computer system including a communication interface (for example, an Ethernet transceiver, an Ethernet controller, or the like) 11 connected to the communication line 61 and the activation line 62, a processor 12, and a storage device 13. The storage device 13 stores a computer program (hereinafter referred to as "connection authentication program") describing a command for executing the connection authentication process. The processor 12 performs the connection authentication process by interpreting and executing the connection authentication program.

Figure 2:
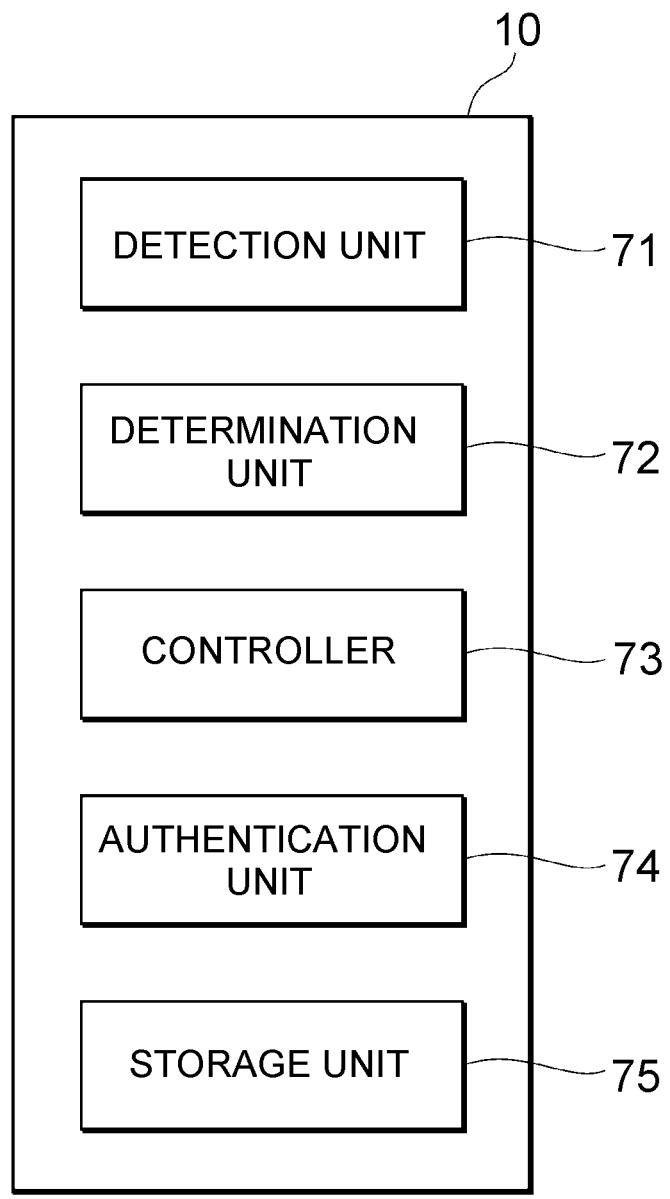
FIG. 2 is a functional block diagram of the electronic control unit according to the embodiment of the present disclosure.

FIG. 2 is a functional block diagram of the electronic control unit 10 according to the embodiment of the present disclosure. When the processor 12 interprets and executes the connection authentication program, various functions of a detection unit 71, a determination unit 72, a controller 73, an authentication unit 74, and a storage unit 75 are implemented. The various functions are implemented by collaboration between hardware resources of the electronic control unit 10 and the connection authentication program stored in the storage device 13. The details of the functions will be described later. The connection authentication program may include, for example, a plurality of software modules that are invoked and executed in a main program. Such software modules are subprograms modularized for executing the processes that implement the various functions. The functions similar to the various functions may be implemented by using dedicated hardware resources (for example, an application-specific integrated circuit (ASIC), a field programmable gate array (FPGA), or the like) or firmware. The storage device 13 is a computer-readable storage medium, such as a semiconductor memory or a disc medium, for example.

The detection unit 71 determines that a connection request from the outside device 40 to the electronic control unit 10 is received, when the activation line 62 transits from non-active to active. In response to the connection request from the outside device 40, the determination unit 72 determines whether or not a start condition for starting the connection authentication process of the outside device 40 is satisfied. The start condition refers to a condition for starting the connection authentication process of the outside device 40 without the possibility of the vehicle 200 permitting an illegal connection request even when the illegal connection request is made by the outside device 40. For example, the start condition is to satisfy at least one condition out of: (i) the vehicle 200 is not in automatic driving; (ii) the travel speed of the vehicle 200 is less than a threshold speed (for example, 5 km/h); and (iii) a signal related to operation control of the vehicle 200 that is transmitted on the on-board network 100 has a safety request level less than a threshold level. As the safety request level, an automotive safety integrity level ASIL defined by ISO 26262 can be used, for example. As the threshold level, the level same as the ASIL that corresponds to the risk of severe or life-threatening failure may be used, for example. The controller 73 controls the communication state between the outside device 40 and the electronic control unit 10 to a link-down state, until the start condition is determined to be satisfied. With such configuration, connection authentication does not start when the vehicle 200 is in automatic driving, or when the travel speed of the vehicle 200 is faster than a threshold value, for example. Accordingly, safety and performance is further enhanced. When it is determined that the start condition is satisfied, the controller 73 controls the communication state between the outside device 40 and the electronic control unit 10 to a linkup state. When the communication state between the outside device 40 and the electronic control unit 10 is in the linkup state, the authentication unit 74 starts a connection authentication process for determining the propriety of the connection request from the outside device 40. In the connection authentication process, the authentication unit 74 may authenticate whether or not the connection request is from the diagnostic tool of an official operator (for example, dealer) by a publicly-known method (for example, a method disclosed in JP2016-48848 A).

Whether or not the vehicle 200 is in automatic driving may be determined based on flag information (flag information indicating that the vehicle is in automatic driving) that is transmitted from an electronic control unit related to automatic driving control. Whether or not the travel speed of the vehicle 200 exceeds a threshold speed may be determined based on flag information (flag information indicating that the travel speed of the vehicle 200 exceeds the threshold value) that is transmitted from an electronic control unit related to measurement of the vehicle speed. Whether or not a signal, related to driving control of the vehicle 200, transmitted on the on-board network 100 has a safety request level exceeding a threshold level may be determine based on flag information (flag information indicating that the safety request level of the signal related to the operation control of the vehicle 200 exceeds the threshold level) that is transmitted from an electronic control unit related to processing of the signal having a safety request level exceeding the threshold level. Such flag information is periodically transmitted from each of the electronic control units through the on-board network 100. The storage unit 75 stores a history of such flag information in time series. The storage unit 75 stores a history of the state transition (transition from non-active to active, and transition from active to non-active) of the activation line 62 in time series. When a connection request is made by the outside device 40, the storage unit 75 stores a history of information indicating whether or not the start condition is satisfied in time series. The start condition for starting the connection authentication process of the outside device 40 may also include (iv) when the start condition is not satisfied at the time of a connection request from the outside device 40, a predetermined time has elapsed after the connection request, in addition to the aforementioned conditions (i) to (iii). The determination unit 72 can determine whether or not the condition (iv) is satisfied from various kinds of serial information stored in the storage unit 75.

Figure 3:
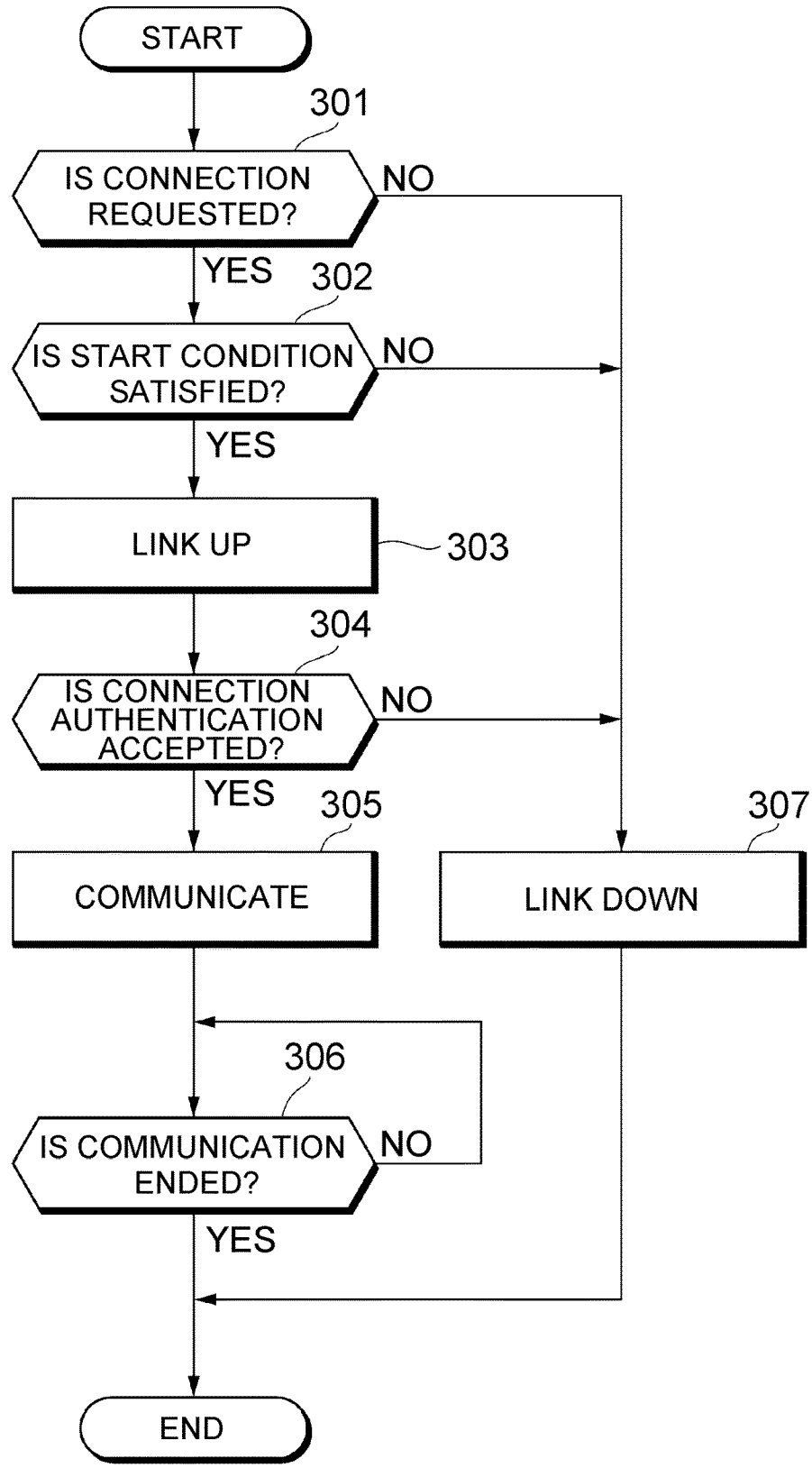
FIG. 3 is a flowchart showing a process flow of a method for connection authentication according to the embodiment of the present disclosure.

FIG. 3 is a flowchart showing the process flow of a method for connection authentication according to the embodiment of the present disclosure. Since the outline of each process shown in FIG. 3 is overlapped with the description of FIG. 2, simple description will be given here.

In step 301, the electronic control unit 10 determines whether or not a connection request from the outside device 40 to the on-board network 100 is received. When the activation line 62 transits from non-active to active, the electronic control unit 10 determines that the connection request from the outside device 40 to the electronic control unit 10 is received.

In step 302, the electronic control unit 10 determines whether or not the start condition for starting the connection authentication process of the outside device 40 is satisfied. The electronic control unit 10 determines whether or not at least one of the conditions (i) to (iii) is satisfied, or whether or not at least one of the conditions (i) to (iv) satisfied based on the flag information transmitted on the on-board communication network 100.

In step 303, the electronic control unit 10 controls the communication state between to outside device 40 and the electronic control unit 10 from a link-down state to a linkup state. The communication state between the outside device 40 and the electronic control unit 10 is the link-down state, until the start condition is determined to be satisfied.

In step 304, the electronic control unit 10 starts a connection authentication process for determining the propriety of the connection request from the outside device 40. A publicly-known method can be used as the connection authentication process.

In step 305, the electronic control unit performs communication (for example, diagnosis communication) with the outside devices 40 through the communication line 61.

In step 306, the electronic control unit 10 determines whether or not the communication with the outside devices 40 is ended.

In step 307, the electronic control unit 10 controls the communication state between the outside device 40 and the electronic control unit 10 to the link-down state.

According to the embodiment of the present disclosure, in response to a connection request from the outside device 40 (step 301; YES), the electronic control unit 10 determines whether or not the start condition for starting the connection authentication process of the outside device 40 is satisfied (step 302). When the start condition is satisfied (step 302: YES), the electronic control unit 10 controls the communication state between the outside device 40 and the electronic control unit 10 to the linkup state (step 303), and starts the connection authentication process for determining the propriety of the connection request from the outside device 40 (step 304). Hence, even when an illegal connection request is made by the outside device 40, the possibility that the vehicle 200 permits the illegal connection request can be reduced.

In the above description, the electronic control unit 10 that performs the connection authentication process for determining the propriety of a connection request from the outside device 40 is incorporated in the concentrator 21. However, any one electronic control unit out of the electronic control units 31 to 34 connected to the concentrator 21 (or any one electronic control unit out of the electronic control units 35 to 38 connected to the concentrator 22) may perform the connection authentication process for determining the propriety of the connection request from the outside device 40.

The embodiment described in the foregoing is presented for easy understanding of the present disclosure and is not presented for restrictive interpretation of the disclosure. Modifications and reformations of the present disclosure are possible without departing from the meaning thereof, and the equivalency thereof are also embraced in the present disclosure.

What is claimed is:

1. An electronic control unit mounted on a vehicle, comprising
 a processor configured to:
  detect a connection request from an outside device;
  determine, in response to the connection request, whether or not a start condition for starting a connection authentication process is satisfied, the connection authentication process being a process for determining propriety of the connection request from the outside device;
  control a communication state between the outside device and the electronic control unit such that the communication state becomes a linkup state when the start condition is satisfied; and
  start the connection authentication process when the communication state is the linkup state.

2. The electronic control unit according to claim 1, wherein the start condition is to satisfy at least one condition out of:
 (i) the vehicle is not in automatic driving;

(ii) a travel speed of the vehicle is less than a threshold speed;
(iii) a signal related to driving control of the vehicle, the signal being transmitted through an on-board network, has a safety request level less than a threshold level; and
(iv) a predetermined time has elapsed since the processor detects the connection request from the outside device, when the start condition is not satisfied at a time when the processor detects the connection request from the outside device.

3. The electronic control unit according to claim 1, wherein:
the outside device is a diagnostic tool;
the vehicle includes a connector and an activation line;
the activation line is configured to transit from non-active to active when the diagnostic tool is connected to the connector; and
the processor is configured to determine, when the activation line transits from non-active to active, that the connection request is received from the diagnostic tool.

4. The electronic control unit according to claim 1, wherein the processor is configured to control the communication state between the outside device and the electronic control unit such that the communication state becomes a link-down state, until the processor determines that the start condition is satisfied.

5. A method for connection authentication, comprising:
detecting a connection request from an outside device to an on-board network;
determining, in response to the connection request, whether or not a start condition for starting a connection authentication process is satisfied, the connection authentication process being a process for determining propriety of the connection request from the outside device;
controlling a communication state between the outside device and the on-board network such that the communication state becomes a linkup state when the start condition is satisfied; and
starting the connection authentication process when the communication state is the linkup state.

6. An electronic control unit mounted on a vehicle, comprising
a processor configured to:
detect a connection request from an outside device;
determine, in response to the connection request, whether or not a start condition for starting a connection authentication process is satisfied, the connection authentication process being a process for determining propriety of the connection request from the outside device;
control a communication state between the outside device and the electronic control unit such that the communication state becomes a linkup state when the start condition is satisfied; and
start the connection authentication process when the communication state is the linkup state,
wherein the start condition is satisfied when a travel speed of the vehicle is less than a threshold speed.

* * * * *

UNITED STATES PATENT AND TRADEMARK OFFICE
CERTIFICATE OF CORRECTION

PATENT NO. : 10,839,619 B2  
APPLICATION NO. : 16/249661  
DATED : November 17, 2020  
INVENTOR(S) : Shu Ishizuka et al.

Page 1 of 1

It is certified that error appears in the above-identified patent and that said Letters Patent is hereby corrected as shown below:

On the Title Page

Item (71), applicant, city, delete "Toyota" and insert --Toyota-shi Aichi-ken--, therefor.

Item (72), Inventor 1, city, delete "Okazaki" and insert --Okazaki-shi Aichi-ken--, therefor.

Item (72), Inventor 2, city, delete "Toyota" and insert --Toyota-shi Aichi-ken--, therefor.

Item (72), Inventor 3, city, delete "Nagakute" and insert --Nagakute-shi Aichi-ken--, therefor.

Item (72), Inventor 4, city, delete "Okazaki" and insert --Okazaki-shi Aichi-ken--, therefor.

Item (73), assignee, city, delete "Toyota" and insert --Toyota-shi Aichi-ken--, therefor.

In the Specification

In Column 3, Line(s) 39, after "control", delete ",".

In Column 5, Line(s) 61, after "between", delete "to" and insert --the--, therefor.

Signed and Sealed this  
Second Day of March, 2021

Drew Hirshfeld  
*Performing the Functions and Duties of the*  
*Under Secretary of Commerce for Intellectual Property and*  
*Director of the United States Patent and Trademark Office*